United States Patent [19]

Horimai et al.

[11] Patent Number: 4,959,820
[45] Date of Patent: Sep. 25, 1990

[54] MAGNETOOPTICAL RECORDING APPARATUS WITH CONSTANT LEAKAGE MAGNETIC AND PULSE MODULATED MAGNETIC FIELD

[75] Inventors: Hideyoshi Horimai, Chiba; Yoshio Aoki, Tokyo, both of Japan

[73] Assignee: Sony Corporation, Tokyo, Japan

[21] Appl. No.: 436,345

[22] Filed: Nov. 14, 1989

Related U.S. Application Data

[63] Continuation of Ser. No. 40,250, Apr. 26, 1987, abandoned.

[30] Foreign Application Priority Data

Apr. 22, 1986 [JP] Japan ................................. 61-93087

[51] Int. Cl.$^5$ ........................ G11B 11/12; G11B 13/04
[52] U.S. Cl. ......................................... 369/13; 360/59; 360/114
[58] Field of Search ...................... 369/13; 360/59, 114; 365/122

[56] References Cited

U.S. PATENT DOCUMENTS

| | | | |
|---|---|---|---|
| 4,477,852 | 10/1984 | Ota et al. | 369/13 |
| 4,660,190 | 4/1987 | Fujii et al. | 369/13 |
| 4,672,594 | 6/1987 | Kato et al. | 360/114 |
| 4,706,232 | 11/1987 | Funada et al. | 365/122 |

FOREIGN PATENT DOCUMENTS

| | | | |
|---|---|---|---|
| 0153676 | 9/1985 | European Pat. Off. | 369/13 |
| 3706966 | 9/1987 | Fed. Rep. of Germany | 360/114 |
| 57-94906 | 6/1982 | Japan | 369/13 |
| 59-119507 | 7/1984 | Japan | 360/114 |
| 59-148159 | 8/1984 | Japan | 360/114 |
| 59-172175 | 9/1984 | Japan | 369/13 |
| 60-214438 | 10/1985 | Japan | 360/114 |
| 60-214439 | 10/1985 | Japan | 360/114 |
| 61-96540 | 5/1986 | Japan | 360/114 |
| 61-190741 | 8/1986 | Japan | 369/13 |

Primary Examiner—Stuart S. Levy
Assistant Examiner—Hoa Nguyen
Attorney, Agent, or Firm—Hill, Van Santen, Steadman & Simpson

[57] ABSTRACT

A magnetooptical recording apparatus is disclosed which is capable of performing real-time overwrite operation. The apparatus comprises a laser beam and focusing parts thereof, and a pulse magnetic field generator device, procided on both sides of a magnetooptical recording medium, respectively. The laser beam and focusing parts thereof are formed of an objective lens connected to a moving coil which is provided with a magnet, thus the objective lens is movable relative to a magnetic layer of the magnetooptical recording medium by the interaction between the magnet and the moving coil. The magnet generates and applies a D.C. magnetic field of one polarity perpendicular to the magnetic thin film around a point where the laser beam is focused, while the pulse magnetic field generator device generates pulse magnetic field of the opposite polarity modulated by information signal around the point where the laser beam is focused. Thus one and opposite polarity magnetic field pulse row obtained by a sum of the D.C. magnetic field and the pulse magnetic field is applied to the magnetic thin film upon laser beam irradiation to perform the real-time overwrite operation.

4 Claims, 5 Drawing Sheets

MAGNETOOPTICAL RECORDING APPARATUS WITH CONSTANT LEAKAGE MAGNETIC AND PULSE MODULATED MAGNETIC FIELD

This is a continuation of application Ser. No. 040,250, filed Apr. 26, 1987, now abandoned.

BACKGROUND OF THE INVENTION

1. Field of the Invention

The present invention relates to a magnetooptical recording apparatus capable of performing an overwrite operation which writes new information over the former information previously written on a magnetooptical recording medium.

2. Prior Art

A magnetooptical recording medium such as a disc has a magnetic thin film having perpendicular anisotropy on a light transmitting base. FIG. 9 typically illustrates the magnetization of such a perpendicular magnetization film 1A in a non-recorded or erased state, wherein the direction of the magnetization is indicated by arrows. For example, as shown, the film 1A is uniformly magnetized in one direction of its thickness throughout the entire area thereof. FIG. 10 typically illustrates the magnetization of the film 1A in a first recorded state obtained on the basis of first recording information, wherein the magnetization is inverted in a region 2A. Such recording is performed by first irradiating, for example, with a laser beam applied to the magnetizable film 1A to heat the irradiated spot up to its Curie temperature or a recording temperature for a compensation temperature, and then applying an external magnetic field thereto to cause inversion of the magnetization. For rewriting the recorded film 1A by another recording based on second information, it is necessary to erase the first information previously recorded. If such erasure is performed merely by the application of a magnetic field with regard to the entire area of the magnetooptical recording medium, the erasure time required becomes as long as several times ten minutes with increase of power consumption in the case of erasing, for example, a five-inch disc along its recording track by continuously applying a magnetic field thereto.

As compared with the above, in an overwrite mode where a first recorded state shown in FIG. 10 is rewritten to a second recorded state based on second information as shown in FIG. 11, no particular time is needed for erasure and consequently the rewrite can be achieved with a high efficiency.

There is known a technique of magnetic field modulation to perform such overwrite operation, but it has not yet been put to practical use due to various problems. One of the problems resides in that, for obtaining a second recorded state of FIG. 11 in the overwrite operation executed by the general magnetic field modulation, it is necessary to generate, in accordance with an information signal, recording and erasing magnetic fields of positive and negative polarities which are mutually opposite with respect to the direction of thickenss of the film 1A, in such a manner that the magnetization of a recorded region 2A in FIG. 10 is inverted and erased while new inversions of magnetization are caused in other regions 2B and 2C. And for causing such inversions at a high frequency, it is requisite to reduce the number of turns of the electromagnetic coil in the magnetic field generating means so as to minimize the inductance thereof. In this case, however, the current for energizing the coil needs to be greater correspondingly to such reduction, hence raising another problem of generation of heat. Furthermore, a driving power source required to invert such a great current with positive and negative polarities at a high frequency becomes dimensionally large with a considerable amount of power consumption. In addition, it is extremely difficult to attain satisfactory frequency characteristic in the above case.

Meanwhile, FIG. 8 graphically shows the recording characteristic of a magnetooptical recording medium which has a perpendicular magnetization film composed of TbFeCo, measured when an external magnetic field is applied thereto, wherein a broken-line curve represents a recorded noise level and a solid-line curve represents a recorded carrier level. It is obvious therefrom that a high noise level and hence a low C/N are induced in a range of the external magnetic field from $H_{SI}$ to $H_{SII}$ or, more specifically, from +100 (Oe) to −100 (Oe) in this example. (Hereinafter the range from $H_{SI}$ to $-H_{SII}$ is referred to as high-noise magnetic field region). Accordingly, in erasing and recording this magnetooptical recording medium, application of a proper magnetic field outside of such high-noise magnetic field region is a requisite for raising the C/N, and therefore the overwriting positive and negative field levels for the above-mentioned recording and erasing operations are required to be relatively high. As a result, the magnetic field generating means for applying such external magnetic field needs to produce a great magnetic field to consequently bring about a disadvantage of increased power consumption.

OBJECT AND SUMMARY OF THE INVENTION

Accordingly, it is an object of the present invention to provide an improved magnetooptical recording apparatus capable of performing an overwrite operation.

It is another object of the present invention to provide a magnetooptical recording apparatus capable of performing overwrite operation by applying magnetic field modulated by information signal to a magnetooptical recording medium.

According to one aspect of the present invention there is provided a magnetooptical recording apparatus which comprises supporting and transporting means supporting and transporting a magnetooptical recording medium having a perpendicular anisotropy magnetic thin film formed on a nonmagnetic substrate, laser beam means provided on one side of said magnetooptical recording medium, including a magnet and a moving coil mechanically connected to an objective lens through which said laser beam is irradiated on said magnetic thin film, thus controlling the focusing of said laser beam, said magnet generating and applying a D.C. magnetic field of one polarity perpendicular to a major surface of said magnetic thin film around a point where said laser beam is focused, and pulse magnetic field generating means provided on another side of said magnetooptical recording medium, applying pulse magnetic field having opposite polarity to said one polarity and perpendicular to said major surface of said magnetic thin film to said magnetic thin film around said point, said pulse magnetic field being modulated according to an information signal to be recorded on said magnetooptical recording medium.

DESCRIPTION OF THE PREFERRED EMBODIMENTS

Figure 1:
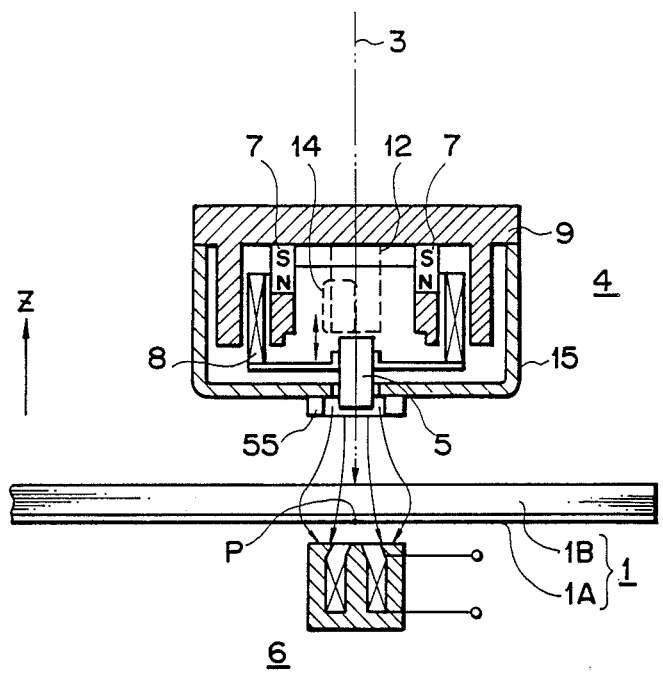
FIG. 1 shows the constitution of an exemplary magnetooptical recording apparatus embodying the present invention.

The present invention has been accomplished in view of the fact that, in any magnetooptical recording apparatus equipped with a biaxial adjusting mechanism which includes a magnetic means such as a permanent magnet to generate a DC magnetic field and serves to adjust at least the focusing of an object lens in an optical system for laser beam irradiation, it is difficult to avoid leakage of a magnetic field component from such magnet to the magnetooptical recording medium. And the feature of the present invention resides in positively utilizing such leakage magnetic field to perform an overwrite operation which records a new signal while erasing the previously recorded signal although a pulse magnetic field generated in accordance with the new signal to be recorded has a single-channel unipolar waveform.

The magnetooptical recording apparatus of the present invention will now be described below with reference to FIG. 1, wherein there is shown a magnetooptical recording medium 1 such as a magnetooptical disc comprising a disc-shaped transparent base 1B of glass or resin and a magnetic thin film having perpendicular anisotropy which is composed of rare-earth metal and transition metal such as TbFeCo and is formed on the base by sputtering or the like. And a laser beam 3 is irradiated onto the magnetic thin film 1A of the recording medium 1. The laser beam 3 is focused at a predetermined position on the film 1A under control of a focusing servo and a tracking servo. Denoted by 4 is an adjusting means or laser beam means having a function for adjustment of such focusing. The adjustment is executed by slightly moving an objective lens 5 of a laser-beam optical system forward to or backward from the surface of the recording medium 1 in the direction vertical thereto (hereinafter referred to as Z-axis direction). The position adjusting means 4 for the object lens 5 is disposed opposite to the base 1B of the recording medium 1 so that the laser beam 3 focused through the object lens 5 is irradiated to the magnetic thin film 1A via the base 1B of the recording medium.

Practically, such position adjusting means 4 has magnets such as permanent magnets 7 to generate a DC magnetic field orthogonal to the surface of the recording medium 1, and a moving coil 8 fed with a focusing servo current is incorporated in a magnetic circuit including the magnets 7, so that the coil 8 is moved in the Z-axis direction in accordance with the servo current. Although the means 4 is magnetically shielded to minimize leakage of the magnetic field therefrom, it is still impossible to avert some leakage to the recording medium 1 from the location of at least the objective lens 5.

Meanwhile on the reverse side with respect to the location of the adjusting means 4, there is disposed a single-channel pulse magnetic field generating means 6 opposite to the object lens 5 with the magnetooptical recording medium 1 interposed therebetween.

Figure 6A:
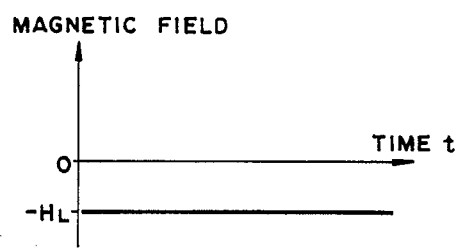
FIGS. 6A to 6C graphically show magnetic fields applied to a magnetooptical recording medium.
Figure 6B:
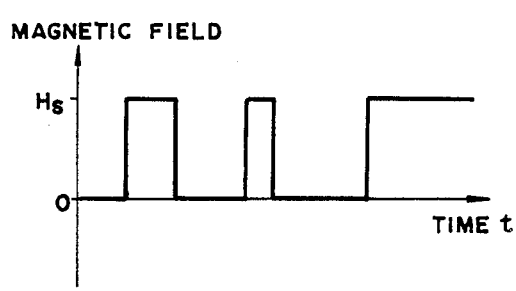

In the constitution mentioned, with regard to a vertical magnetic field component orthogonal to the recording medium 1 at a point P where the axis of the pulse magnetic field generating means 6 intersects the magnetic thin film 1A of the recording medium 1, a vertical field component $-H_L$ of a predetermined DC level is applied as shown in FIG. 6A to the point P by the leakage magnetic field from the position adjusting means 4 for the object lens 5. In this state, a vertical pulse magnetic field orthogonal to the recording medium 1 is also applied thereto from the pulse magnetic field generating means 6 while being switched on and off in accordance with a recording signal. As shown in FIG. 6B, the pulse magnetic field has a single-channel required level $H_S$ opposite in polarity to the field component $-H_L$ due to the leakage magnetic field of FIG. 6A derived from the means 4. Then it follows that the vertical magnetic field component applied to the point P on the film 1A of the magnetooptical recoring medium 1 is substantially the sum of the magnetic fields shown in FIGS. 6A and 6B, that is, the double-channel bipolar pulse magnetic field shown in FIG. 6C. In this bipolar pulse magnetic field where the positive pulse magnetic field has a level $H_R$ and the negative pulse magnetic field has a level $-H_E$, it is desired to properly select the level $-H_E$ of the vertical leakage magnetic field derived from the means 4 and the level $H_R$ of the vertical pulse magnetic field applied from the means 6 in such a manner as to satisfy the conditions $|H_R| > |H_{SI}|, |H_E| > H_{SII}|$.

Figure 7A:
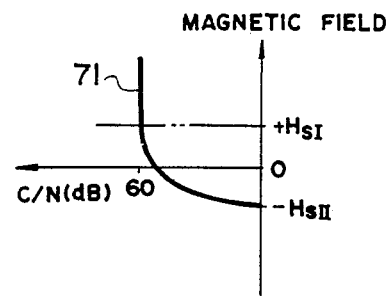
FIG. 7A shows the characteristic curve of the recording medium.
Figure 7B:
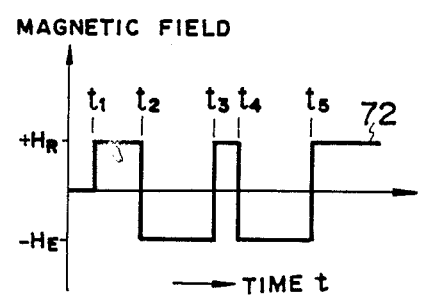
FIG. 7B shows the magnetic field applied to the recording medium.
Figure 6C:
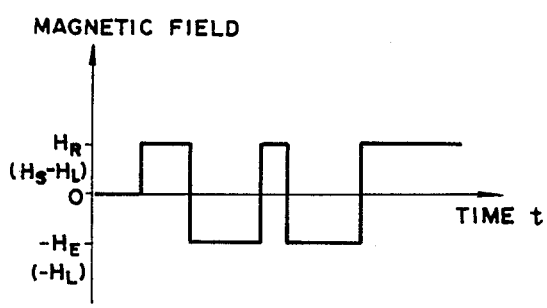
Figure 7C:
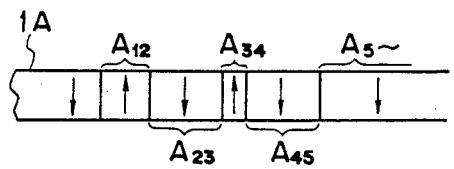
FIG. 7C typically shows the state of magnetization of the recording medium.
Figure 9:
FIGS. 9, 10 and 11 typically show magnetization in a non-recorded or erased state, a first recorded state and a second recorded state of the magnetooptical recording medium, respectively.
Figure 10:
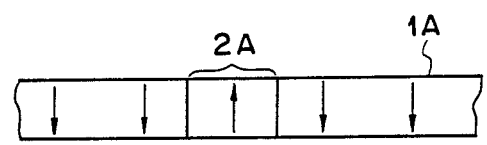
Figure 11:
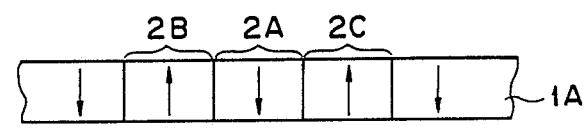

Supposing now that the laser beam 3 is focused at the point P on the magnetic thin film 1A of the magnetooptical recording medium 1 and the temperature thereat is raised to its Curie temperature of the magnetic thin film or a recording temperature for a compensation temperature recording, the magnetization in the heated spot is once disappeared or the coercive force is reduced, but when heated spot is cooled due to movement of the irradiation point of the laser beam 3 on the medium 1, the point P is magnetized in the direction determined by the magnetic field resulting from the peripheral magnetization of the point P in the state where any external magnetic field is not applied thereto or the intensity of such external magnetic field is small. However, when the bipolar pulse magnetic field of FIG. 6C is applied in such a heated state under the condition that the negative magnetic field $-H_E$ or the leakage magnetic field $-H_L$ from the adjusting means 4 is greater in intensity than the magnetic field which impedes erasure because of, e.g. the peripheral magnetization around the laser-beam irradiated point P, negative magnetization is executed for erasure regardless of the peripheral magnetization or the previous recorded state. If the positive magnetic field $+H_R(=H_S-H_L)$ is so selected as to have an intensity sufficient for recording at the laser-beam irradiated point P, a new signal can be recorded in the spot to which such magnetic field HR is applied. Describing the above function in further detail with reference to FIG. 7, when a pulse magnetic field having a waveform 72 of FIG. 7B similar to the aforementioned one of FIG. 6C is applied to the magnetooptical recording medium 1 having the recording characteristic represented by a curve 71 in FIG. 7A, a recording magnetic field $+H_R$ is applied during t1–t2, t3–t4 and t5— while an erasing magnetic field $-H_E$ is applied during t2–t3 and t4–t5, so that regions A12, A34 and A5—corresponding respectively to the durations t1–t2, t3–t4 and t5—are magnetized regardless of the previous recording as shown in FIG. 7C with movement of the point P on the film 1, thereby forming recorded regions inverted from the non-recorded or erased state described in connection with FIG. 9; while regions A23 and A45 corresponding respectively to the duration t2–t3 and t4–t5 are magnetized in a state where the previously recorded signal is erased.

Figure 8:
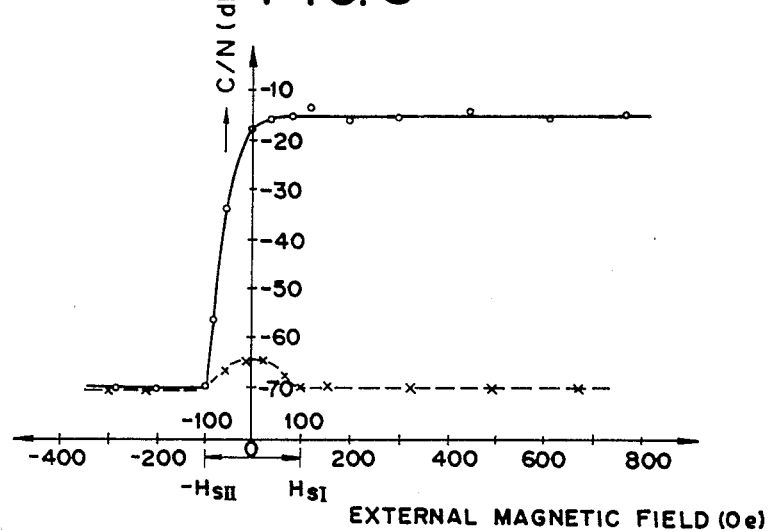
FIG. 8 graphically shows the measured characteristic curve of the recording medium.

If the aforementioned conditions $|H_R|>|H_{SI}|$, $|H_E|>|H_{SII}|$ are satisfied in this case, the erasing and recording operations are performed outside the range from $+H_{SI}$ to $-H_{SII}$, i.e. outside the high-noise magnetic field region described in FIG. 8, so that low-noise and high C/N recording can be achieved. The width of such high-noise magnetic field region is selectively changeable to a certain extent depending on the composition of the magnetic material of the film 1A and the method of producing the film.

EXAMPLE

Figure 2:
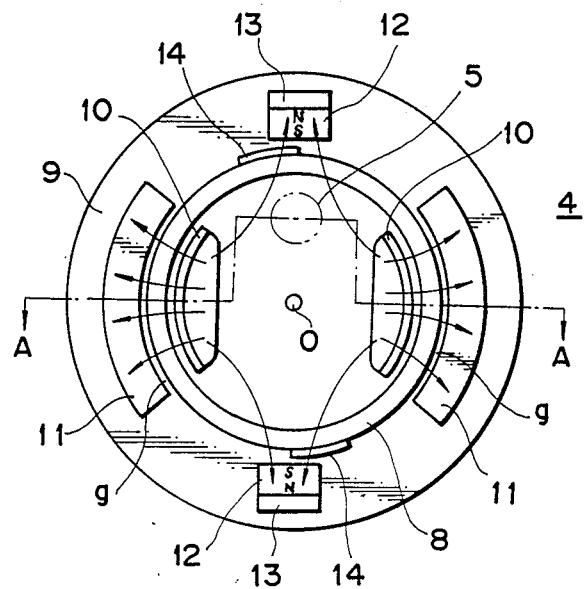
FIG. 2 is a bottom view of an adjusting means for an objective lens of an optical system used in the apparatus.
Figure 3:
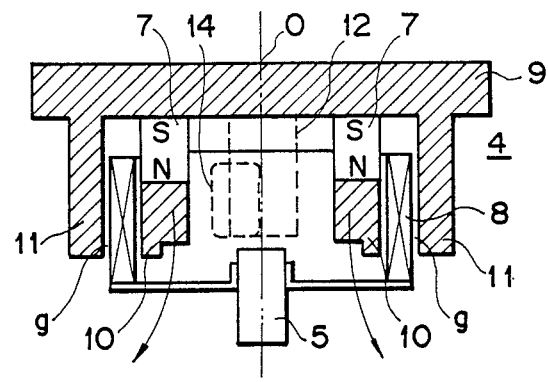
FIG. 3 is a sectional view taken along the line A—A in FIG. 2.
Figure 4:
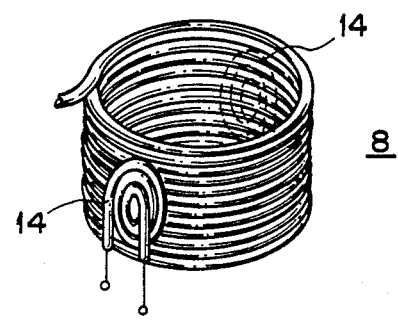
FIG. 4 is a perspective view of a moving coil employed in the embodiment.

In the constitution shown in FIG. 1, the position adjusting means 4 for the objective lens 5 can be fabricated as a biaxial structure which is capable of slightly moving the objective lens 5 in the Z-axis direction while slightly rotating the lens 5 within a plane orthogonal to the Z-axis. As shown in an enlarged bottom view of FIG. 2 and a sectional view of FIG. 3 taken along the line A—A in FIG. 2, the adjusting means 4 comprises a yoke base plate 9 of a soft magnetic material, a first pair of permanent magnets 7 attached to the lower surface of the base plate 9 symmetrically with respect to a center axis 0 extending in the Z-axis direction, inner pole pieces 10 of a soft magnetic material disposed on the permanent magnets 7 respectively and coupled magnetically thereto, and outer pole pieces 11 disposed opposite to the outer surfaces of the magnets 7 and the inner pole pieces 10 with a gap g maintained therebetween and projecting from the lower surface of the base plate 9. The outer surfaces of the magnets 7 and the inner pole pieces 10 disposed thereon are formed into a common cylindrical surface surrounding the center axis 0, and the inner surfaces of the outer pole pieces 11 opposed thereto are also formed into a cylindrical surface surrounding the center axis 0. Each of the magnets 7 is magnetized to have an N-pole and an S-pole in the direction of its thickness corresponding to the Z-axis direction. Between the two outer pole pieces 11 attached to the lower surface of the base plate 9, a second pair of permanent magnets 12 are disposed at an angular interval of 180° with respect to the center axis 0, and a magnetic plate 13 integral with the base plate 9 is coupled magnetically to the outer surfaces of the magnets 12. Each of the magnets 12 is magnetized to have an N-pole and an S-pole respectively on its inside opposed to the center axis 0 and its outside reverse thereto. As indicated by solid-line arrows in FIG. 2, two pairs of mutually opposite magnetic fields having a radially reverse 180° difference are formed around the center axis 0 at an angular interval of 90°, thereby constituting a magnetic circuit. And in this magnetic circuit, a moving coil 8 is disposed in the gap g in such a manner as to traverse each magnetic field around the center axis 0. An objective lens 5 is attached mechanically along the center axis of the moving coil 8 at an eccentric position having a deviation from such center axis. As shown in FIG. 4, a pair of auxiliary coils 14 wound around an axis orthogonal to the center axis of the moving coil 8 are attached to the outer surface of the moving coil 8 at an angular interval of 180° held to the center axis of the moving coil 8. Thus the moving coil 8 and hence the object lens 5 are displaced forward or backward along the Z-axis in accordance with the direction and the magnitude of the focusing servo current flowing in the moving coil 8, while the rotation around the Z-axis is determined depending on the direction and the magnitude of the servo current flowing in the coil 14, whereby the position of the objective lens 5 is biaxially adjusted. Since such adjusting means 4 is so formed as to produce a magnetic field, it is unavoidale that some leakage of the magnetic field occurs therefrom. Practically, as shown in FIG. 1, the means 4 forms a magnetic shield case 15 to cover the entirety of a magnetic circuit including the base plate 9 and the magnets 7, 12 as well as the moving coil 8 incorporated therein, but still some magnetic flux leaks out toard the magnetooptical recording medium 1 through the window where the objective lens 5 is existent. Particularly in case the magnets 7 employed are magnetized in the Z-axis direction, the leakage magnetic field vertical to the medium 1 becomes considerably great. The feature of the present invention resides in utilizing such leakage magnetic field as the aforementioned erasing magnetic field $-H_E$.

Figure 5:
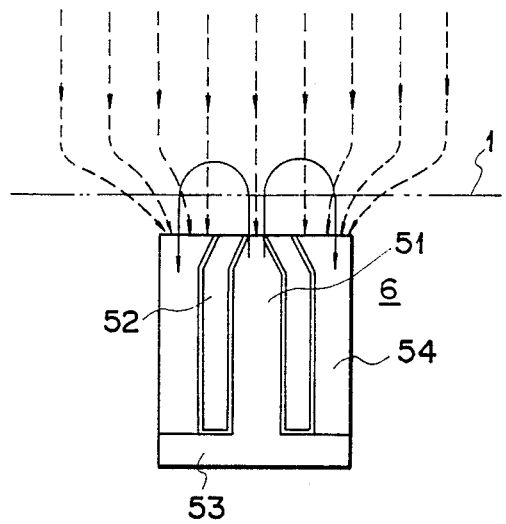
FIG. 5 is a sectional view of an exemplary pulse magnetic field generating means.

The pulse magnetic field generating means 6 comprises, as shown in FIG. 5, a columnar main magnetic pole 51 whose fore end is in the shape of a truncated cone and is opposed to the magnetooptical recording medium 1, and a coil 52 wound around the main magnetic pole 51 and energized with a pulse current corresponding to a recording signal. At the hind end of the main magnetic pole 51 on the reverse side of its fore end opposed to the medium 1, there is provided a flange 53 integral with the main magnetic pole 51, and a cylindrical yoke 54 is disposed on the flange 53 in such a manner as to surround the outer surface of the coil 52. An open end of the cylindrical yoke 54 is pressed against the flange 53 and is magnetically coupled thereto. And the fore end of the main magnetic pole 51 is exposed to the outside through the upper end of the yoke 54.

The main magnetic pole 51 with its flange and the yoke 54 are composed of a low-loss soft magnetic material which causes little hysteresis loss or eddy current loss, such as Ni-Zn ferrite having a saturation flux density of 3700 gauss and a coercive force of 0.55 oersted.

The tapered fore end of the main magnetic pole 51 has a selected angle of 45° for example so as to be capable of achieving satisfactory concentration of the magnetic flux and thereby applying a recording magnetic field of a required high intensity to the medium 1. The main magnetic pole 51 is dimensionally so selected as to have a diameter of 3 mm, a length of 5 mm and a fore-end diameter of 1 mm, for example.

Meanwhile, the yoke 54 may be dimensionally so selected as to have an inner diameter of 6 mm, an outer diameter of 7 mm and a height of 5 mm.

The coil 52 wound around the main magnetic pole 51 is composed of conductors twisted and bundled in such a manner that a plurality of thin wire elements coated with an insulator material are connected in parallel with one another. Each of the wire elements constituting the coil 52 is so thin that the skin effect thereof at the employed frequency is negligible, and it is usually composed of a low-resistance material such as copper and has a diameter of 0.1 mm or so which is about twice the surface depth at the employed frequency.

According to such pulse magnetic field generating means 6, a magnetic circuit is formed by way of the aforesaid main magnetic pole 51—yoke 54—flange 53. And when a single-channel pulse current is applied to flow in the coil 52 as indicated by solid-line arrows in FIG. 5, a pulse magnetic field is generated forward from the fore end of the central main magnetic pole 51 vertically to the medium 1 opposed thereto. Meanwhile, as described previously in connection with FIG. 1, the field generating means 6 is disposed opposite to the position adjusting means 4 with the recording medium 1 interposed therebetween, so that the leakage magnetic flux derived from the means 4 and utilized as an erasing magnetic field can be effectively concentrated by the means 6 serving as an opposite magnetic pole as shown by broken lines in FIG. 5.

In the structure where the coil 52 of the pulse magnetic field generating means 6 is composed of parallel conductors of thin wire elements as mentioned above, it becomes possible to avert the problem of reduced efficiency with generation of heat and another problem of increased power consumption that may otherwise by caused by concentrative flow of the current to the periphery of the coil due to the skin effect as in a conventional structure where the coil is composed of a single wound wire.

Although in the above embodiment the erasing magnetic field is formed merely by the leakage magnetic field from the adjusting means, if necessary, as shown in FIG. 1, a ring-shaped auxiliary magnet 55 magnetized in the direction of its thickness (Z-axis direction) may be disposed in the periphery of the portion where the object lens 5 is existent, so as to adjust the intensity of the magnetic field.

As described hereinabove, according to the present invention where the leakage magnetic field from the object-lens adjusting means 4 is utilized as one of required magnetic fields, it is not necessary to invert the magnetic field in erasing and recording operations, and an overwrite mode can be executed merely by a single-channel pulse magnetic field to form a desired pattern of magnetization in the recording medium 1 where the direction of magnetization is mutually inverted with respect to an erased region and a recorded region. Therefore, remarkably great advantages are achievable in practical use including improvements in the electrical and mechanical structure of the magnetic field applying means as well as in the frequency characteristic, and structural simplification of the power supply.

We claim as our invention:

1. A magnetooptical recording apparatus comprising; supporting and transporting means for supporting and transporting a magnetooptical recording medium having a perpendicular anisotropy magnetic thin film formed on a nonmagnetic substrate, laser beam means, for operating a laser beam, provided on one side of said magnetooptical recording medium, including a magnet and a moving coil movable for controlling the focusing of said laser beam, mechanically connected to an objective lens through which said laser beam is irradiated on said magnetic thin film, said magnet generating and applying a D.C. magnetic field of one polarity perpendicular to a major surface of said magnetic thin film around a point where said laser beam is focused, and pulse magnetic field generating means provided on the opposite side of said magnetooptical recording medium from said laser beam means, for applying a singlepolarity pulsed magnetic field, having opposite polarity to said one polarity, and perpendicular to said major surface of said magnetic thin film around said point, said pulsed magnetic field being modulated according to information signal to be recorded on said magnetooptical recording medium.

2. A magnetooptical recording apparatus according to claim 1, said magnet is a permanent magnet.

3. A magnetooptical recording apparatus according to claim 1, said magnet and said moving coil are enclosed in a shield case except said objective lens through which said D.C. magnetic field is applied to said magnetic thin film.

4. A magnetooptical recording apparatus according to claim 1, said pulse magnetic field generating means are formed of a center magnetic core facing to said magnetooptical recording medium and a coil wound around said core.

* * * * *